July 28, 1936.  J. P. DESMET  2,048,847
LIQUID SPRAY DEVICE
Original Filed April 2, 1934   3 Sheets-Sheet 1

INVENTOR
John P. Desmet
BY
ATTORNEY

July 28, 1936.  J. P. DESMET  2,048,847
LIQUID SPRAY DEVICE
Original Filed April 2, 1934  3 Sheets-Sheet 2
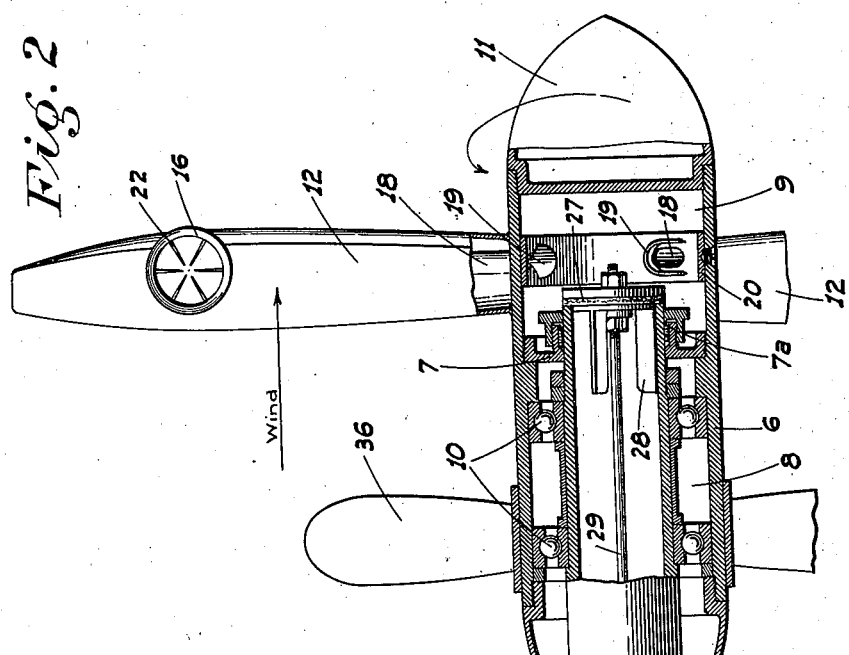
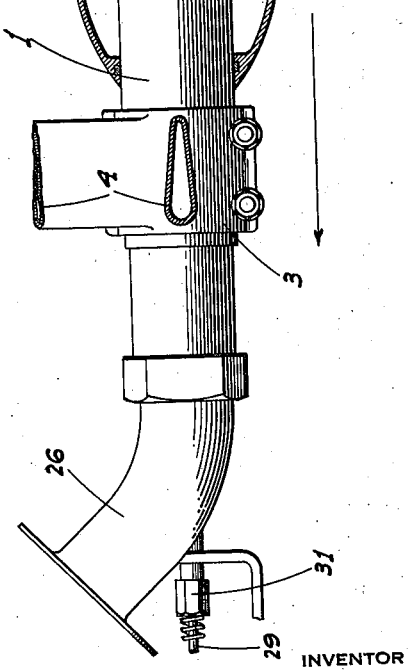
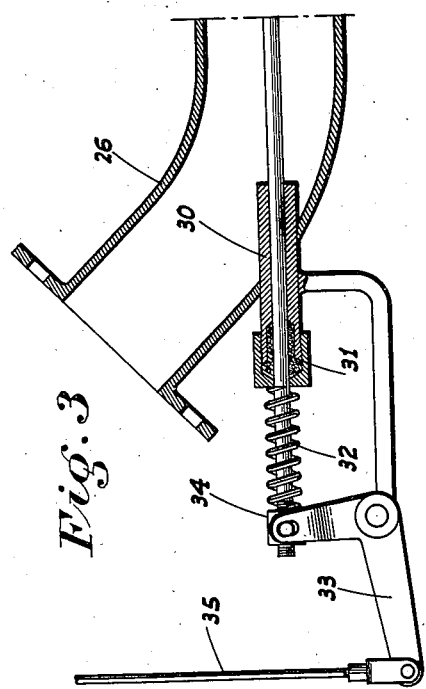
INVENTOR
*John P. Desmet*
BY
ATTORNEY

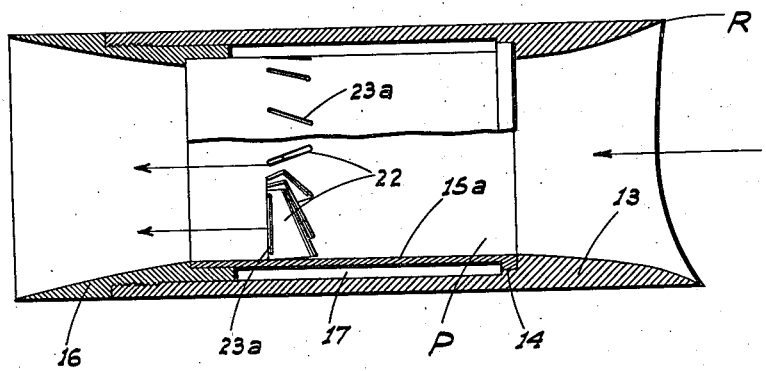
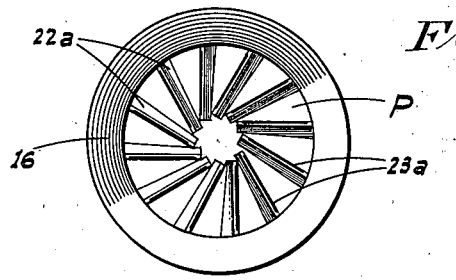
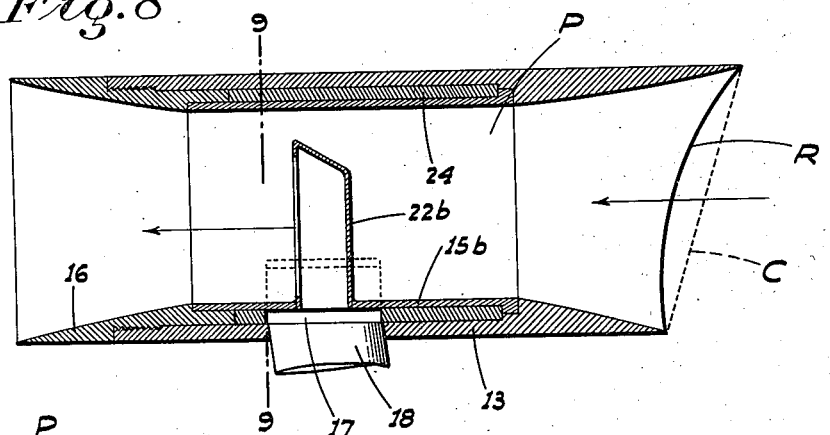
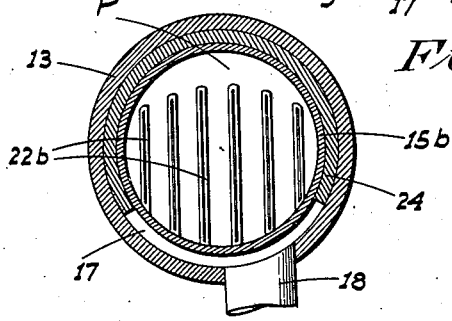

Patented July 28, 1936

2,048,847

UNITED STATES PATENT OFFICE 2,048,847

LIQUID SPRAY DEVICE

John P. Desmet, Modesto, Calif., assignor of one-half to E. R. Hawke, Modesto, Calif.

Application April 2, 1934, Serial No. 718,616
Renewed December 27, 1935

16 Claims. (Cl. 244—1)

This invention relates to liquid spray devices and particularly to one for attachment to an airplane, whereby with the flight of the airplane a fine liquid spray will be formed and distributed onto the foliage and plants below the path of flight of the airplane.

My present invention also particularly represents improvements over the structure shown in my Patent No. 1,892,139, issued December 27, 1932, my principal object now being to increase the efficiency of the device both as to the atomizing and vaporizing of the liquid and to the volume which may be distributed from the apparatus and distributed in a given length of time. Efficient spraying work over a large area may therefore be performed in a very short time will resultant savings in labor and operating costs.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a plan view of the device, mainly in section.

Fig. 3 is an enlarged fragmentary view showing the control means for the liquid regulating valve.

Fig. 6 is a similar view of a modified form of nozzle unit, detached from the blade.

Fig. 7 is a discharge-end view of the same.

Figs. 8 and 9 illustrate another modified form of nozzle.

Figure 1:
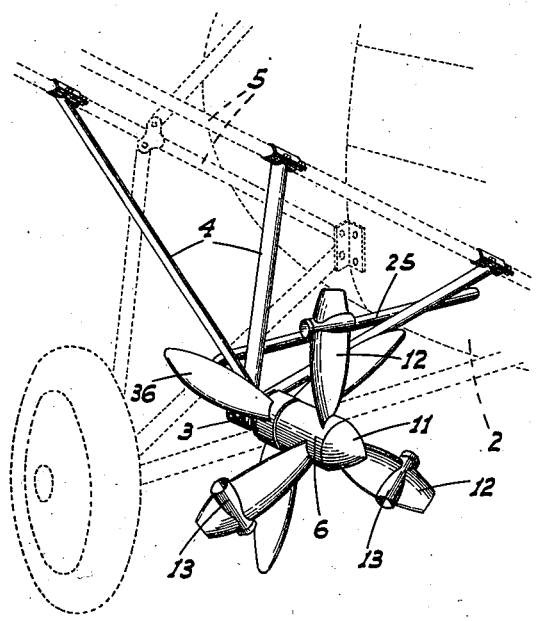
Fig. 1 is a fragmentary perspective outline of an airplane showing one of my improved spray forming and distributing attachments mounted thereon.

Referring now to the characters of reference on the drawings, and particularly at present to Figs. 1 to 5, each spray unit, of which there are two (one on each side of the airplane), comprises a tubular spindle 1 which extends lengthwise of the airplane to one side of and in spaced relation to the fuselage 2 and substantially parallel to the major axis of the same. At its forward end the spindle is supported and clamped against rotation in a bearing 3 which is supported by struts 4 connected to and depending from the wing struts 5 of the airplane.

Turnable on the spindle 1 rearwardly of the bearing is a relatively large hollow cylindrical body 6. This projects rearwardly of the spindle, which is open on its rear end, a partition 7 in the body adjacent the rear end of the spindle being provided with a packing gland 7a engaging the adjacent portion of the spindle. The body is therefore divided into front and rear chambers 8 and 9, the forward chamber containing anti-friction bearings 10 between the body and the spindle and the rear chamber 9 receiving the liquid flowing from the adjacent end of the spindle. The rear end of the body and consequently the chamber 9 is closed by a removable stream line nose or cap 11.

Secured on and projecting radially from the body adjacent its rear end, or beyond the partition 7, are propeller blades 12, pitched so as to be rotated at a suitable speed by the air stream set up with the flight of the airplane. Mounted in the blades toward their outer ends are the spray forming and distributing units. Each unit comprises an outer tube 13 whose axis is disposed in a plane at right angles both transversely and radially of the axis of the body.

The interior of the tube toward one end is formed with a seat 14 for the adjacent end of a relatively short and small inner tube 15. The opposite end of said inner tube is removably engaged and held centered by a tubular nut 16 which is removably screwed into the adjacent end and forms an extension of the tube 13. The bore of the nut 16 and the tube 13 beyond the tube 15 are the same as that of said tube at the junction therewith, so that a passage P through the tube 13 is formed from end to end of the same which is free from any projections or pockets which would interfere with a smooth flow of air therethrough.

The form of the passage P, being of relatively restricted size along its central position, forms a Venturi tube, the leading air intake end of which is the high pressure zone, the central restricted portion is the air compression and high speed zone, while the trailing end portion is the low pressure or vacuum zone.

The leading end of the outer Venturi tube member 13 is cut back in the direction of the edge nearest the axis of rotation as shown at C, while the forward side of the tube at said end is also cut back or relieved relative to the back edge, as shown at R. This insures the maximum amount of air being received into the tube, both with the rotative action of the tube about its axis of rotation, and with the movement of the airplane through the air.

Figure 4:
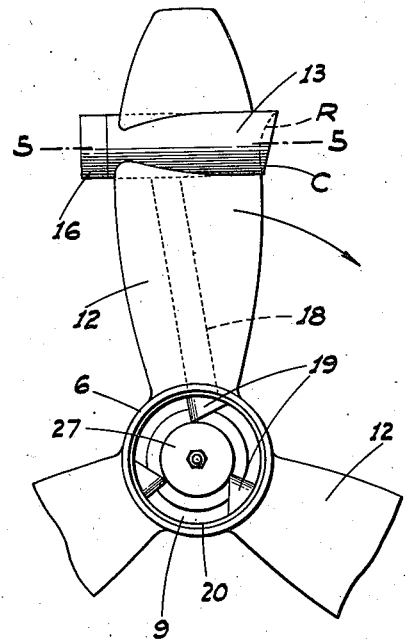
Fig. 4 is a fragmentary end view of the device with the end nose or cap removed.

Between the seat 14 and the nut 16, and between the tubes 13 and 15, a liquid-tight enclosed chamber 17 is formed which is connected to the body chamber 9 by a conduit 18 extending lengthwise in the blade 12, said blade being hollow for the sake of lightness. Scoops 19 are mounted on a ring 20 which is removably fitted in the chamber 9 so that the said scoops register with the adjacent ends of the different conduits 18 to aid in gathering up the liquid in the chamber 9 with the rotation of the device and feeding such liquid to the conduits. The conduits preferably slope toward their outer ends in a direction away from that of the rotation of the blades as shown in Fig. 4 so as to further aid in the ready flow of the liquid to the chambers 17.

Figure 5:
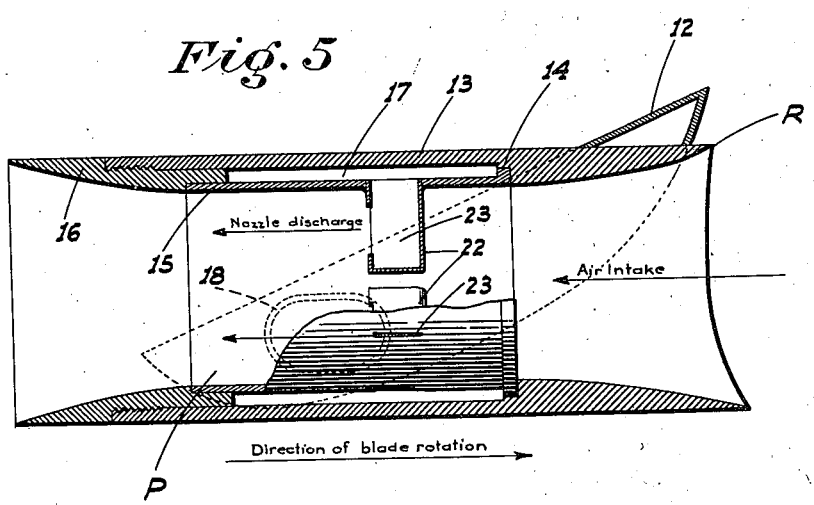
Fig. 5 is a cross section of a blade and one form of spray nozzle tube mounted thereon, taken on the line 5—5 of Fig. 4.

Projecting inwardly and radially from the inner tube 15 intermediate its ends is a plurality of thin circumferentially spaced jet or nozzle members 22, having radial slit-like passages 23 leading to the chamber 17 from those edges of the nozzles which face the trailing end of the tube 13, as shown in Fig. 5.

The conduit 18 is designed so that its cross sectional area is approximately one-third greater than that of the combined area of the nozzle slits. As a result of this arrangement the liquid is under pressure at the nozzles and is forced through the same. This is necessary in order to have a large volumetric flow through the nozzles, especially with heavy liquid mixtures, which must be positively forced through the narrow nozzle slits. This forcing action of the liquid is aided by the inclination of the conduit 18, which may be considered and is in effect an impeller tube.

The purpose of removably mounting the nozzle tubes in the fixed tubes 13 is to enable nozzle tubes having different nozzle arrangements to be interchanged in position in said fixed tubes, depending on the type of liquid mixture employed or on the volumetric discharge desired. Another nozzle arrangement particularly designed for great volumetric discharge relative to the nozzle arrangement shown in Fig. 5, is shown in Figs. 6 and 7. In this case the nozzle mmebers 22a in the removable tube 15a are greater in number than the nozzles 22 and are disposed somewhat on a bias longitudinally of the tube relative to the axial plane of the same as shown in Fig. 6. Also they are not radially disposed but are tangent to an imaginary circle concentric with the axis of the tube, as shown in Fig. 7. The discharge openings from the nozzle passages 23a are adjacent the trailing ends of the nozzles but on the leading side of the same relative to the direction of rotation of the propeller unit. This arrangement not only provides for a large volumetric discharge of liquid but insures a thorough atomizing of the liquid by the air stream flowing through the tube from its leading end, on account of the particular positioning of the nozzles as described which causes the air to be agitated and broken up as it comes in contact with the flows past the nozzles.

A still different nozzle arrangement is shown in Figs. 8 and 9, this being particularly designed for a liquid mixture in which the solid content is heavy and tends to precipitate, such as lead arsenate. In this case the nozzles 22b in the tube 15b are parallel to each other and project straight across the tube in spaced relation from the side of the same nearest the intake conduit 18. To guard against the possibility of the lead arsenate etc. precipitating on the walls of the chamber 17 on the side thereof opposite the nozzle passages, and which would throw the device out of balance, a filler ring 24 is disposed about the tube 15b, which fills up all the area of the chamber 17 except that immediately adjacent the conduit 18 and the intake openings to the nozzles. In all cases it is to be understood that the length and diameter of the nozzle tubes is the same so that they can be interchangeably mounted in the tubes 13 by merely removing the nuts 16.

The liquid is continuously fed to the spindle from a pipe 25 leading laterally from a supply tank in the fuselage of the airplane (not shown). The outer end of the pipe is connected, to the adjacent end of the spindle 1, in front of the bearing 3, by a pipe fitting 26 which is formed with an elbow as shown in Fig. 1. The flow of liquid through the pipe and spindle and into the chamber 9 may be controlled by a master valve adjacent the tank, but during operation is controlled by a flat disc valve 27 engaging the rear end of the spindle. The valve is maintained in centralized relation with said spindle by guide fingers 28 connected thereto and slidably projecting into the spindle.

A rod 29 secured to the valve projects through the spindle to its rear end and passes through the side of the elbow fitting 26, being there supported by a bearing 30 which is provided with a packing gland 31. A spring 32 about the rod outwardly of the gland acts to hold the valve in its closed position against the spindle. Said valve is opened against the resistance of the spring by suitable means controlled by the pilot of the airplane. In the present instance such means is shown as comprising a bell crank 33 mounted in connection with the elbow 26 or other fixed parts. One arm of the bell crank engages a collar 34 on the outer end of the rod while the other arm is connected to a pull rod 35 extending into the cockpit of the airplane.

Projecting outwardly from the body 1 adjacent its forward end are booster propeller blades 36. These may be disposed on the same pitch as the blades 12 but are circumferentially staggered relative thereto. These blades are also of course in the air stream and aid in rotating the device as a whole and increase the speed of the same, besides relieving the blades 12 of some of the strain.

In operation, with the flight of the airplane the body and blade unit rotates at a speed circumferentially proportional to the speed of the airplane. With such rotation the liquid, which is being constantly discharged into the chamber 9 from the spindle 1, is scooped up and thrown along the conduits 18 to the chambers 17 by centrifugal action, aided by the scoops 19. At the same time air is flowing through the tubes 13 and 15 due to the blades cutting through the air. As a result the liquid in the chambers 17 is forced through the nozzle passages as previously explained and discharged into the Venturi tube passages P where said liquid is there thoroughly mixed with the air flowing through said passages before being discharged into the surrounding atmosphere. This mixing action is aided by the fact that the majority of the air passing through the tube is agitated by the numerous jet members which are disposed in the path of the air. The position of the discharge ends of the nozzle passages relative to the flow of air through the tubes increases the suctional or injector action on the liquid, aiding the pressure discharge of the same, and enables a greater volume of liquid to be drawn into the Venturi passages than would otherwise be the case.

The particular form and direction of opening of the valve 27 causes the liquid flowing from the spindle to be discharged radially into the chamber 9 and toward the inner circumferential wall of the same, thus aiding in the immediate flow of the liquid into the conduits 18, whether the scoops are used or not.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A liquid spray device including an open ended tube, means mounting the tube for rotation through the air about a relatively remote axis and so that the axis of the tube is disposed tangent to its circle of rotation, means for rotating the tube, circumferentially spaced jet members mounted in and projecting part way across the interior of the tube, said members having passages opening into the tube in facing relation to the trailing end thereof, and means for feeding a liquid to the jet passages with such rotation.

2. A liquid spray device including an open ended tube, means mounting the tube for rotation through the air about a relatively remote axis and so that the axis of the tube is disposed tangent to its circle of rotation, means for rotating the tube, circumferentially spaced jet members projecting into the tube radially thereof, said members having passages extending therethrough from the exterior of the tube to interior terminations in facing relation to the trailing end of said tube, an outer tube about and secured to the first named tube to leave an enclosed chamber therebetween and all about the same, and means to feed liquid to the chamber.

3. A structure as in claim 2, with means to removably mount the jet supporting tube in the outer tube.

4. A liquid spray device including an open ended tube, means mounting the tube for rotation through the air about a relatively remote axis and so that the axis of the tube is disposed tangent to its circle of rotation, means for rotating the tube, means forming an enclosed chamber about the tube, means to feed liquid to the chamber with the rotation of the tube, and means to cause liquid in the chamber to be discharged into the tube in facing relation to the trailing end thereof.

5. A liquid spray device including a tubular passage spindle fixed at one end, a body turnable on and projecting beyond the spindle, means forming an enclosed chamber in the body into which the spindle discharges, conduits radiating from the body and communicating with the chamber, liquid vaporizing and discharge units mounted at the outer ends of and connected to the conduits, means to feed liquid into the spindle, means to rotate the body, and scoops projecting into the chamber and registering with the adjacent ends of the conduits.

6. A structure as in claim 1, in which such feeding means includes an impeller tube the cross sectional area of which is in excess of the combined area of the jet passages at their open end.

7. A liquid spray device for airplanes comprising a rotary unit which includes a body, extending lengthwise of the airplane and positioned in the air stream set up by the movement of the airplane, propeller blades fixed on the body, liquid vaporizing and discharge units mounted in the blades and including conduits communicating with the interior of the body, means turnably supporting the body and including means to feed liquid to the conduits, and additional propeller blade mounted on the body in front of and in circumferentially staggered relation to the first named blades.

8. A liquid spray device for airplanes comprising a rotary unit mounted on the airplane, said unit including propeller blades positioned in the path of the air stream to be rotated thereby, means to feed liquid to the unit, means formed with the unit and blades to cause such liquid to be vaporized and discharged into the atmosphere with the rotation of the unit, and additional propeller blades fixed with the unit in front of and in circumferentially staggered relation to the first named blades.

9. A liquid spray device including a fixed tubular passage spindle, open at its rear end, a hollow body turnable on and projecting rearwardly from the spindle, means forming an enclosed chamber in the body into which the rear end of the spindle discharges, conduits mounted on the body and radiating from the chamber, liquid vaporizing and discharge units to which the conduits lead, means to rotate the body, an elbow fitting connected to and projecting from the forward end of the fitting for connection to a source of liquid supply, a valve over the rear chamber end of the spindle, a rod secured to the valve and projecting forwardly along and inside the spindle and out through one side of the fitting, a spring about the rod acting to hold the valve closed, and manual control means applied to the outer forward end of the rod to move the same in a valve opening direction against the resistance of the spring.

10. A liquid spray device including an open ended tube, means to move the tube through the air so that air will flow through the tube with such movement, a chamber about the tube, means to feed liquid to the chamber, and circumferentially spaced jet members projecting into the tube, said members having passages extending therethrough and leading from the chamber to terminations in facing relation to the trailing end of the tube.

11. A liquid spray device for an airplane including an open ended tube, means mounting the tube for rotation about a circular path disposed transversely of the airplane and so that the axis of the tube is tangent to such path, means to rotate the tube, a chamber about the tube, means to supply liquid to the chamber, circumferentially spaced jet members projecting into the tube and disposed on a bias lengthwise thereof, said members being relatively narrow transversely of the tube; said members having slit-like passages extending therethrough and leading from the chamber to terminations in the tube in the leading side of the jet members relative to the direction of rotation of the tube but adjacent the trailing end of said members.

12. A liquid spray device for an airplane including an open ended tube, means mounting the tube for rotation about a circular path disposed transversely of the airplane and so that the axis of the tube is tangent to such path, means to rotate the tube, a liquid supply conduit leading toward the tube substantially radial with the axis of rotation thereof, a segmental chamber communicating with the outer end of the conduit and extending part way about the tube, and a plurality of jet-passage members projecting into the tube transversely thereof and parallel to each other, the jet passages communicating with the chamber and terminating in the tube in facing relation to the trailing end thereof.

13. A liquid spray device including an open ended tube mounted for movement through the air, a conduit connected to the tube intermediate its ends, means to feed a liquid into the conduit, an inner relatively short tube spaced from and removable relative to the outer tube, jet openings in the wall of said inner tube, means to removably locate and support the inner tube at one end and closing the adjacent space between the tubes, and a tubular element separate from and forming an extension of the outer and inner tubes at the opposite end of the latter, removably mounted on the outer tube and both engaging the adjacent end of the inner tube and closing the adjacent space between the tubes.

14. A liquid spray device for an airplane including an open ended tube, means mounting the tube for rotation about a circular path disposed transversely of the airplane and so that the axis of the tube is tangent to such path, means to rotate the tube, and means to feed spray material into the tube intermediate its ends; the leading end of said tube being cut back in the direction of the axis of rotation thereof, and its forward side being also relieved at said end whereby to insure a maximum amount of air being drawn into the tube with the combined rotation of the tube and the movement of the airplane.

15. A liquid spray device comprising a cylinder adapted to be revolved at a relatively high speed, such cylinder being armed with radially extending tubes in open communication with the interior of such cylinder, liquid dispersers at the outer ends of the tubes, a liquid conductor leading axially into the cylinder and terminating closely adjacent the inner open ends of the tubes, a closure over the inner end of the conductor and adapted to open inwardly of the cylinder and toward the tube openings, whereby when the closure is opened the liquid will move radially toward the walls of the cylinder and be hence immediately moved into the tubes.

16. A liquid spray device comprising a cylinder adapted to be revolved at a relatively high speed, such cylinder being armed with radially extending tubes in open communication with the interior of such cylinder, liquid dispersers at the outer ends of said tubes, a liquid conductor leading into said cylinder to a point closely adjacent the tube openings, and means for controlled dispersion of liquid radially outward from the inner end of the conductor and toward the walls of the cylinder whereby upon such dispersion of the liquid the same will be hence immediately moved into said tubes.

JOHN P. DESMET.